(12) United States Patent
Andersen

(10) Patent No.: US 6,401,054 B1
(45) Date of Patent: Jun. 4, 2002

(54) METHOD OF STATISTICAL ANALYSIS IN AN INTELLIGENT ELECTRONIC DEVICE

(75) Inventor: Bo L. Andersen, Burlington, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/221,243

(22) Filed: Dec. 28, 1998

(51) Int. Cl.[7] .......................... G06F 17/18; G06F 11/30; G21C 17/00
(52) U.S. Cl. .......................... 702/179; 702/185; 702/188
(58) Field of Search .......................... 702/57, 58, 59–62, 702/64–66, 72, 81–89, 130, 182–185, 179, 188, 189; 361/71, 115; 324/74, 601; 340/657, 658, 661

(56) References Cited

U.S. PATENT DOCUMENTS

| | | | |
|---|---|---|---|
| 3,710,302 A | | 1/1973 | Shannon et al. ............. 439/142 |
| 4,066,960 A | * | 1/1978 | Milkovic ..................... 324/142 |
| 4,371,908 A | * | 2/1983 | Andow et al. ................. 361/83 |
| 4,720,802 A | * | 1/1988 | Damoulakis et al. ....... 704/233 |
| 4,783,748 A | * | 11/1988 | Swarztrauber et al. ........ 702/62 |
| 5,463,749 A | * | 10/1995 | Wertheizer et al. ......... 711/110 |
| 5,561,610 A | * | 10/1996 | Schricker et al. ........... 702/185 |
| 5,619,014 A | | 4/1997 | Faulkner ..................... 174/68.2 |
| 5,650,936 A | * | 7/1997 | Loucks et al. ................. 702/62 |
| 5,682,888 A | * | 11/1997 | Olson et al. ................. 600/436 |
| 5,736,847 A | * | 4/1998 | Van Doorn et al. .......... 324/142 |
| 5,902,934 A | * | 5/1999 | Sprague et al. ................ 73/779 |
| 6,014,465 A | * | 1/2000 | Blixt et al. ................... 382/237 |
| 6,182,022 B1 | * | 1/2001 | Mayle et al. ................. 702/182 |
| 6,185,508 B1 | * | 2/2001 | Van Doorn et al. ........... 702/60 |
| 6,256,594 B1 | * | 7/2001 | Yamamaoto et al. ....... 702/185 |

OTHER PUBLICATIONS

Hogg, Robert V. and Tanis, Elliot A. Probability and Statistical Inference. 1997. Prentice Hall. Fifth Edition. pp. 15, 16.*

* cited by examiner

Primary Examiner—Marc S. Hoff
Assistant Examiner—Manuel L. Barbee
(74) Attorney, Agent, or Firm—Cantor Colburn LLP

(57) ABSTRACT

A method of statistical analysis in an intelligent electronic device for data reduction and analysis is presented. The intelligent electronic device includes a microcontrol and associated memories. An algorithm (program) stored in memory of the intelligent electronic device processes real time data on measured and/or calculated electrical parameters using recognized statistical and/or numerical techniques. The algorithm will issue events and/or alarms when observed data is recognized to deviate in statistically significant amounts from statistical values. Allowing only valuable user information, as opposed to "raw" unprocessed and potentially insignificant data, to be sent across a limited capacity network for potential user intervention. Thereby saving network capacity and ensuring that a user is automatically notified of significant events requiring further analysis and/or intervention.

36 Claims, 1 Drawing Sheet

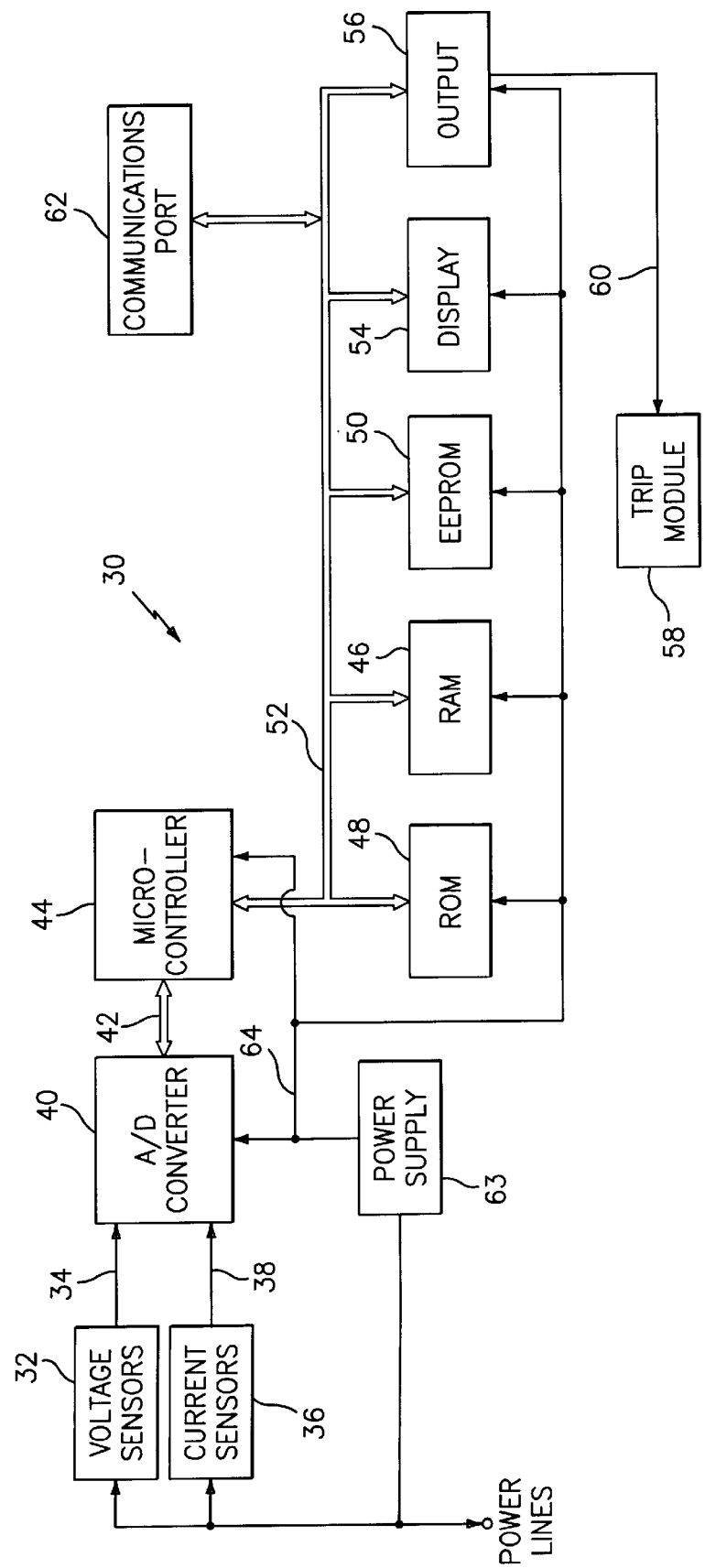
FIGURE

METHOD OF STATISTICAL ANALYSIS IN AN INTELLIGENT ELECTRONIC DEVICE

BACKGROUND OF THE INVENTION

This invention relates generally to intelligent electronic devices (IEDs), e. g., electronic trip units, protective relays, circuit breakers, energy meters, power quality meters, power monitors, power analyzers, motor control center controllers and relays, programmable logic controllers, programmable logic controller I/Os, and loop-controllers. More specifically, the present invention relates to a method of applying statistical analysis techniques in intelligent electronic devices for data reduction and analysis.

Intelligent electronic devices, e. g., electronic trip units, protective relays, circuit breakers, energy meters, power quality meters, power monitors, power analyzers, motor control center controllers and relays, programmable logic controllers, programmable logic controller I/Os, and loop-controllers are well known. These devices store real time information within hundreds of registers on measured and/or calculated parameters such as energy, temperature, power quality, electrical parameters, and device status. This information is often periodically communicated, by way of a network, to a centralized monitoring station or processor. However, this information is difficult to analyze due to the high volume of data. Also, if the sampling frequency for sending this data is not sufficiently high, i.e. finely granular, then there is a possibility of missing peak conditions.

BRIEF SUMMARY OF THE INVENTION

It is therefore seen to be desirable to apply statistical analysis techniques in an intelligent electronic device for data reduction and analysis. A method of statistical analysis in an intelligent electronic device utilizing a statistical analysis algorithm in the microcontrol of the intelligent electronic device is presented. An electronic trip unit is described herein by way of exemplary embodiment only, as the present invention applies to other intelligent electronic devices as well. The electronic trip unit comprising voltage and current sensors which provide analog signals indicative of the power line signals. The analog signals are converted by an A/D (analog/digital) converter to digital signals which are processed by a microcontrol. The trip unit further includes RAM (random access memory), ROM (read only memory) and EEPROM (electronic erasable programmable read only memory) all of which communicate with the microcontrol. The ROM includes trip unit application code, e.g., main functionality firmware, including initializing parameters, and boot code. The application code includes code for the statistical analysis algorithm of the present invention. The EEPROM includes operational parameters, e.g., code for setting a user selectable number of standard deviations from a mean, for the application code. These parameters may be stored in the trip unit at the factory and are selected to meet customers☐ requirements, but can also be remotely downloaded.

In an exemplary embodiment of the invention real time data of electrical parameters measured and/or calculated by the intelligent electronic device is processed by a statistical analysis algorithm using recognized statistical and/or numerical techniques. The algorithm issues events and/or alarms when observed data is (value) recognized to deviate statistically significantly from an expected range, e.g., an observed value is N (preferably N=3) standard deviations greater or smaller than an expected mean value. In a preferred embodiment, the expected range is a designated number of standard deviations (preferably 3, but alternatively may be designated by a user) from the mean value. The statistical analysis algorithm is performed in the intelligent electronic device itself. Therefore the amount of data required to be transmitted from the intelligent electronic device to a central monitoring station is drastically reduced since only statistically significant deviations need to be communicated. It is significantly less difficult for a user (at a receiving computer) to analyze this information due to the lower volume of data. The means and standard deviations are calculated by the intelligent electronic device itself by analyzing parameters measured over time or user input.

Furthermore, the statistical techniques algorithm makes possible more reliable and accurate detection of developing fault conditions. If the volume of data is not properly analyzed, then preventable fault conditions may be allowed to build up over time. Eventually these fault conditions may become sufficiently severe to cause a major fault event, e.g., a circuit breaker tripping. Once this happens, damage and costly delays to facility operations will have occurred. By reducing the amount of data to be reviewed manually by a user, by several orders of magnitude, the algorithm enhances early detection of these developing fault conditions. In a large facility with hundreds of intelligent electronic devices, this represents a major benefit.

BRIEF DESCRIPTION OF THE DRAWINGS

Referring now to the drawing wherein the FIGURE is a schematic block diagram of an electronic trip unit.

DETAILED DESCRIPTION OF THE INVENTION

Referring to the FIGURE, a general schematic of an electronic trip unit of the present invention is generally shown at 30. It will be appreciated that the present invention is not limited to electronic trip units but is directed to intelligent electronic devices in general. Such intelligent electronic devices include protective relays, circuit breakers, energy meters, power quality meters, power monitors, power analyzers, MCC controllers and relays, programmable logic controllers, programmable logic controller I/Os, and loop-controllers. Trip unit 30 comprises voltage sensor 32 which provides analog signals indicative of voltage measurements on a signal line 34 and a current sensor 36 which provides analog signals indicative of current measurements on a signal line 38. The analog signals on lines 34 and 38 are presented to an A/D (analog/digital) converter 40, which converts these analog signals to digital signals. The digital signals are transferred over a bus 42 to a microcontrol (signal processor) 44, such being commercially available from the Hitachi Electronics Components Group (Hitachi☐s H8/300 family of microcontrols). Trip unit 30 further includes RAM (random access memory) 46, ROM (read only memory) 48 and EEPROM (electronic erasable programmable read only memory) 50 all of which communicate with the microcontrol 44 over a control bus 52. It will be appreciated that A/D converter 40, ROM 48, RAM 46, or any combination thereof may be internal to microcontrol 44, as is well known. EEPROM 50 is non-volatile so that system information and programming will not be lost during a power interruption or outage. Data, typically status of the circuit breaker, is displayed by a display 54 in response to display signals received from microcontrol 44 over control bus 52. An output control device 56, in response to control signals received from microcontrol 44 over control bus 52, controls a trip module 58 via a line 60. Calibration, testing, programming and other features are accomplished through a communications I/O port 62, which communicates with microcontrol 44 over control bus 52. A power supply 63 which is powered by the service electricity, provides appropriate power over a line 64 to the components of trip unit 30. ROM 48 includes trip unit application code, e.g., main functionality firmware, including initializing parameters, and boot code. The application code further includes code for the statistical analysis algorithm of the present invention.

EEPROM 50 includes operational parameter code, e.g., code for setting a user selectable number of standard deviations from the mean. These parameters may be stored in the trip unit at the factory and are selected to meet customers requirements, but can also be remotely downloaded as described hereinafter. The statistical analysis algorithm is run in real-time and is initiated preferably from the boot code at start up.

The statistical analysis algorithm calculates running numerical estimates of a statistical mean and standard deviation of designated parameters (which may be designated by a user). By way of example, measured data such as current, voltage, temperature, or frequency may be utilized. Also by way of example, calculated data such as: energy (voltage× current×phase angle); differential temperatures between circuit breaker contacts and ambient temperature, or between circuit breaker contacts across the phases of a power line; per phase voltages and currents; and repair status of a large facility's intelligent electronic devices may be utilized. Real time measured and/or calculated data is then be compared against the standard deviation. When the real time data is outside a statistically significant amount, e.g., a designated number of standard deviations (which may be input by a user) from the mean, a deviation event signal is generated to alert the user that a deviation event has occurred. In other words, the user is alerted that data (observed value) has statistically significantly deviated from the expected range, e.g., the expected mean or nominal value. The deviation event signal may be communicated to a central monitoring station (not shown) via I/O port 62, or to display 54, or used to operate an alarm (not shown).

Because the statistical analysis algorithm is performed in the intelligent electronic device itself, the amount of data required to be transmitted is drastically reduced since only significant deviations need to be communicated, i.e., valuable information as opposed to raw data is communicated. The unprocessed data may also be transmitted if so desired.

In an exemplary embodiment of the invention, a parameter (or parameters) of an electrical signal is sequentially sampled to provide a plurality of signals indicative of the parameter. The signals are continuously stored in a set of cyclical buffers within the trip unit 30 used to calculate a running mean value M for the parameter tracked.

The running mean value M is calculated using the formula $$M = \frac{1}{n} \sum_{i=1}^{n} X_i$$

where n is the number of stored signals, and $X_i$ is the value of each signal stored. Once a running mean value is calculated, a variance $D_i$ is calculated for each value of $X_i$ using the formula $D_i = (X_i - M)^2$. The set of $D_i$ values are stored in a second set of cyclical buffers of the trip unit 30. Next a running standard deviation value S, as defined by the formula $$S = \sqrt{\frac{1}{(n-1)} \sum_{i=1}^{n} D_i},$$

is calculated from the set of stored $D_i$ variances. As these calculations are processor intensive, standard statistical sampling strategies may be applied to obtain acceptable estimations of running mean and standard deviation values.

Each sample $X_i$ of each parameter tracked is then compared to the running standard deviation S. Samples falling outside of the designated number of standard deviations, e.g., typically the three sigma limits, are flagged as deviation events meriting further operator attention.

Notification can occur by sending a deviation event signal (message) in several ways: (1) generating a deviation event message to be transmitted via a network connection to an attached computer (not shown) or other central monitoring device (not shown); (2) displaying a message on display 54 of the trip unit; or (3) closing a relay contact which in turn may be used to operate a horn, warning light or other alarm (not shown).

All of the aforementioned limits or settings are preferably stored in EEPROM 50 and can be altered by downloading desired settings via communications I/O port 62. This would include remotely downloading such data when the unit is connected to a system computer (not shown), either directly, over telephone lines, or any other suitable connection. It may also be preferred that EEPROM 50 comprises a flash memory whereby such data is flashed, as is well known.

The statistical analysis algorithm drastically reduces the amount of data required to be transmitted from the trip unit 30 to a central monitoring station (not shown) since only significant deviations need to be communicated. Also, it is significantly less difficult to analyze this information due to the lower volume of data.

Furthermore, the statistical techniques algorithm makes possible the more reliable and accurate detection of developing fault conditions before they become sufficiently severe to cause facility downtime, e.g., a circuit breaker tripping. This represents a major benefit for a large facility with many hundreds of intelligent electronic devices to monitor.

While preferred embodiments have been shown and described, various modifications and substitutions may be made thereto without departing from the spirit and scope of the invention. Accordingly it is to be understood that the present invention has been described by way of illustrations and not limitation.

What is claimed is:

1. A method of detecting developing fault conditions using statistical analysis in an intelligent electronic device and reducing quantities of data required to be transmitted from the intelligent electronic device to a central monitoring station, the method comprising:

sensing an electrical signal to provide a plurality of sensed signals indicative of a plurality of values of a parameter of said electrical signal;

determining a statistical value for said parameter from at least two of said sensed signals;

comparing one of said sensed signals to said statistical value to generate a deviation event signal when said value of said one of said sensed signals deviates from said statistical value by a statistically significant amount;

communicating the deviation event signal to a central monitoring station prior to occurrence of a fault condition within the intelligent electronic device; and, limiting transmission of all other sensed signals from the intelligent electronic device to the central monitoring station.

2. The method of claim 1 wherein said statistical value comprises a mean value; and
said determining said statistical value comprises calculating said mean value from the following expression, $$M = \frac{1}{n}\sum_{i=1}^{n} X_i,$$

where,
M is said mean value,
n is a number of said at least two said sensed signals, and
$X_i$ is said value of each of said at least two said sensed signals.

3. The method of claim 2 further comprising:
determining said statistically significant amount from said mean value, said determining said statistically significant amount includes calculating a plurality of variance values from the following expression, $$D_i = (X_i - M)^2,$$

where $D_i$ is each said variance value for each said value $X_i$.

4. The method of claim 3 where in said determining said statistically significant amount further includes:
calculating a standard deviation value from the following expression, $$S = \sqrt{\frac{1}{(n-1)}\sum_{i=1}^{n} D_i},$$

where S is said standard deviation value.

5. The method of claim 4 wherein said statistically significant amount comprises a designated number of said standard deviation values.

6. The method of claim 3 further comprising:
storing said plurality of sensed signals in a first memory of said intelligent electronic device.

7. The method of claim 6 further comprising storing said plurality of variance values in a second memory of said intelligent electronic device.

8. The method of claim 7 wherein said first memory further comprises a first set of cyclical buffers.

9. The method of claim 8 wherein said second memory further comprises a second set of cyclical buffers.

10. The method of claim 1 wherein said determining said statistical value comprises statistical sampling.

11. The method of claim 1 further comprising:
storing said plurality of sensed signals in a first memory of said intelligent electronic device.

12. The method of claim 11 wherein said first memory further comprises a first set of cyclical buffers.

13. The method of claim 1 wherein said parameter comprises a measured parameter or a calculated parameter.

14. The method of claim 13 wherein said measured parameter further comprises temperature, current, voltage or frequency.

15. The method of claim 13 wherein said calculated parameter further comprises energy, differential temperature, repair status, per phase voltage or per phase current.

16. The method of claim 1 further comprising designating a user selectable number of standard deviation values for said statistically significant amount.

17. The method of claim 16 further comprising storing the user selectable number within an EEPROM.

18. An intelligent electronic device comprising:
a sensor for sensing an electrical signal to provide a plurality of sensed signals indicative of a plurality of values of a parameter of said electrical signal; and
a signal processor responsive to said plurality of sensed signals, and having memory for storing signals including program signals for detecting developing fault conditions using statistical analysis and reducing quantities of data required to be transmitted from the intelligent electronic device, the program signals defining an executable program for,
determining a statistical value for said parameter from at least two of said sensed signals;
comparing one of said sensed signals to said statistical value to generate a deviation event signal when said value of said one of said sensed signals deviates from said statistical value by a statistically significant amount;
releasing the deviation event signal prior to occurrence of a fault condition within the intelligent electronic device; and,
limiting transmission of all other sensed signals from the intelligent electronic device.

19. The intelligent electronic device of claim 18 wherein:
said statistical value comprises a mean value; and
said determining said statistical value comprises calculating said mean value from the following expression, $$M = \frac{1}{n}\sum_{i=1}^{n} X_i,$$

where,
M is said mean value,
n is a number of said at least two said sensed signals, and
$X_i$ is said value of each of said at least two said sensed signals.

20. The intelligent electronic device of claim 19 wherein:
said program signals further define said executable algorithm for determining said statistically significant amount from said mean value, wherein said determining said statistically significant amount includes calculating a plurality of variance values from the following expression, $$D_i = (X_i - M)^2,$$

where $D_i$ is each said variance value for each said value $X_i$.

21. The intelligent electronic device of claim 20 wherein:
said determining said statistically significant amount further includes calculating a standard deviation value from the following expression, $$S = \sqrt{\frac{1}{(n-1)}\sum_{i=1}^{n} D_i},$$

where S is said standard deviation value.

22. The intelligent electronic device of claim 21 wherein said statistically significant amount comprises a designated number of said standard deviation values.

23. The intelligent electronic device of claim 20 wherein: said program signals further define said executable algorithm for storing said plurality of sensed signals in a first memory of said intelligent electronic device.

24. The intelligent electronic device of claim 23 wherein said program signals further define said executable algorithm for storing said plurality of variance values in a second memory of said intelligent electronic device.

25. The intelligent electronic device of claim 24 wherein said first memory further comprises a first set of cyclical buffers.

26. The intelligent electronic device of claim 25 wherein said second memory further comprises a second set of cyclical buffers.

27. The intelligent electronic device of claim 18 wherein said determining said statistical value comprises statistical sampling.

28. The intelligent electronic device of claim 18 wherein: said program signals further define said executable algorithm for storing said plurality of sensed signals in a first memory of said intelligent electronic device.

29. The intelligent electronic device of claim 28 wherein said first memory further comprises a first set of cyclical buffers.

30. The intelligent electronic device of claim 18 wherein said parameter comprises a measured parameter or a calculated parameter.

31. The intelligent electronic device of claim 30 wherein said measured parameter further comprises temperature, current, voltage or frequency.

32. The intelligent electronic device of claim 30 wherein said calculated parameter further comprises energy, differential temperature, repair status, per phase voltage or per phase current.

33. The intelligent electronic device of claim 18 further comprising:
a communication port for communicating said deviation event signal to a central monitoring station.

34. A network communication system comprising a central monitoring station and at least one intelligent electronic device, each of said at least one intelligent electronic device comprising:
a sensor for sensing an electrical signal to provide a plurality of sensed signals indicative of a plurality of values of a parameter of said electrical signal; and
a signal processor responsive to said plurality of sensed signals, and having memory for storing signals including program signals for detecting developing fault conditions using statistical analysis and reducing quantities of data required to be transmitted from the intelligent electronic device to the central monitoring station, the program signals defining an executable program for,
determining a statistical value for said parameter from at least two of said sensed signals;
comparing one of said sensed signals to said statistical value to generate a deviation event signal when said value of said one of said sensed signals deviates from said statistical value by a statistically significant amount;
sending the deviation event signal from the intelligent electronic device to the central monitoring station prior to occurrence of a fault condition within the intelligent electronic device; and,
limiting transmission of all other signals from the intelligent electronic device to the central monitoring station.

35. The network communication system of claim 34 comprising a plurality of intelligent electronic devices.

36. The network communication system of claim 35 wherein each of said intelligent electronic devices communicates with said central monitoring station over a network.

* * * * *